(12) United States Patent
Matsuo et al.

(10) Patent No.: US 8,640,649 B2
(45) Date of Patent: Feb. 4, 2014

(54) LIQUID-ABSORBING SHEET FOR ANIMAL LITTER BOX

(75) Inventors: Takayuki Matsuo, Tokyo (JP); Takeshi Ikegami, Tokyo (JP)

(73) Assignee: Uni-Charm Corporation, Ehime (JP)

( * ) Notice: Subject to any disclaimer, the term of this patent is extended or adjusted under 35 U.S.C. 154(b) by 674 days.

(21) Appl. No.: 12/706,013

(22) Filed: Feb. 16, 2010

(65) Prior Publication Data

US 2010/0170449 A1    Jul. 8, 2010

Related U.S. Application Data

(63) Continuation of application No. 10/739,849, filed on Dec. 18, 2003, now abandoned.

(30) Foreign Application Priority Data

Jun. 20, 2003  (JP) .................................. 2003-177383

(51) Int. Cl.
*A01K 29/00* (2006.01)
(52) U.S. Cl.
USPC ........................................ 119/169; 119/166
(58) Field of Classification Search
USPC .................. 119/165–167, 169–173
See application file for complete search history.

(56) References Cited

U.S. PATENT DOCUMENTS

| | | | |
|---|---|---|---|
| 4,020,156 A | 4/1977 | Murray et al. | |
| 4,308,825 A | 1/1982 | Stephanian | |
| 4,487,163 A * | 12/1984 | Jobert et al. | 119/166 |
| 4,494,482 A | 1/1985 | Arnold | |
| 4,534,315 A | 8/1985 | Sweeney | |
| 4,640,225 A | 2/1987 | Yananton | |
| 4,869,204 A * | 9/1989 | Yananton | 119/169 |
| 5,018,482 A | 5/1991 | Stanislowski et al. | |
| 5,031,578 A | 7/1991 | Hammons et al. | |
| 5,358,607 A | 10/1994 | Ellis | |
| 5,488,930 A | 2/1996 | Kasbo et al. | |
| 5,630,376 A * | 5/1997 | Ochi et al. | 119/169 |
| 5,727,499 A | 3/1998 | Armington et al. | |
| 5,797,347 A * | 8/1998 | Ochi | 119/169 |
| 5,819,688 A * | 10/1998 | Walker | 119/169 |

(Continued)

FOREIGN PATENT DOCUMENTS

| | | |
|---|---|---|
| FR | 2 786 698 A1 | 6/2000 |
| JP | 56-173082 U | 12/1981 |

(Continued)

OTHER PUBLICATIONS

Notice of Reasons for Rejection issued to corresponding JP Application No. 2003-177383, mailed Jul. 8, 2008.

(Continued)

*Primary Examiner* — David Parsley
(74) *Attorney, Agent, or Firm* — Brinks Gilson & Lione

(57) ABSTRACT

An animal litter box system that can be used for a long time about 3 to 10 days and can prevent the occurrence of undesirable odors is to be provided, particularly to provide a liquid-absorbing sheet used for the animal litter box system. A liquid-absorbing sheet used for an animal litter box is characterized by comprising an antimicrobial and bacteriostatic part having both an antimicrobial property and a bacteriostatic property; or both of an antimicrobial part having an antimicrobial property and a bacteriostatic part having a bacteriostatic property.

14 Claims, 2 Drawing Sheets

(56) References Cited

U.S. PATENT DOCUMENTS

| | | |
|---|---|---|
| 6,244,216 B1 | 6/2001 | Ochi |
| 6,408,790 B1 | 6/2002 | Maguire |
| 6,412,440 B2 | 7/2002 | Kobayashi |
| 6,460,484 B2 | 10/2002 | Ikegami et al. |
| 6,487,989 B2 | 12/2002 | Yamamoto |
| 6,578,520 B2 | 6/2003 | Otsuji et al. |
| 2001/0009142 A1 | 7/2001 | Otsuji et al. |

FOREIGN PATENT DOCUMENTS

| | | |
|---|---|---|
| JP | S57-200159 | 12/1982 |
| JP | S61-155475 | 7/1986 |
| JP | 63-158160 U | 10/1988 |
| JP | 8-19344 | 1/1996 |
| JP | 8-56518 | 3/1996 |
| JP | 8-56519 | 3/1996 |
| JP | 8-317740 | 12/1996 |
| JP | 9-37670 | 2/1997 |
| JP | 10-225243 | 8/1998 |
| JP | 10-229768 | 9/1998 |
| JP | 10-292262 | 11/1998 |
| JP | 10-313721 | 12/1998 |
| JP | 10-313722 | 12/1998 |
| JP | 11-18603 | 1/1999 |
| JP | 2002-99 | 1/1999 |
| JP | 11-071202 | 2/1999 |
| JP | 11-318252 | 11/1999 |
| JP | 11-332413 | 12/1999 |
| JP | 2000-287570 | 10/2000 |
| JP | 2001-8568 | 1/2001 |
| JP | 2001-314131 | 11/2001 |
| JP | 2001-327225 | 11/2001 |
| JP | 2002-10718 | 1/2002 |
| JP | 0220-078738 | 3/2002 |
| JP | 2002-078738 | 3/2002 |
| JP | 2002-192589 | 5/2002 |
| JP | 2003-102304 | 4/2003 |
| JP | 2003-158930 | 6/2003 |

OTHER PUBLICATIONS

Notice of Reasons for Rejection issued to corresponding JP Application No. 2003-177383, mailed Feb. 3, 2009.

Decision to Grant a Patent issued to corresponding JP 2003-177383, mailed Oct. 6, 2009.

Lee, Jae Yeon, et al., *Lactobacillus pentosus; Korean Journal of Microbiol. Biotechnot.,* vol. 30, No. 3, 241-246 (2002), 6 pgs.

Office Action issued to corresponding KR Application No. 10-2004-0045336 mailed Apr. 1, 2011 and English translation, 8 pgs.

\* cited by examiner

LIQUID-ABSORBING SHEET FOR ANIMAL LITTER BOX

RELATED APPLICATION

This application is a continuation application of U.S. patent application Ser. No. 10/739,849, filed Dec. 18, 2003, now abandoned to which priority is claimed under 35 U.S.C. §120 and through which and to which priority is claimed under 35 U.S.C. §119 to Japanese Patent Application No. 2003-177383, filed Jun. 20, 2003, the complete disclosures of which are hereby expressly incorporated herein by reference.

BACKGROUND OF THE INVENTION

1. Field of the Invention

The present invention relates to a liquid-absorbing sheet used for an animal litter box.

2. Description of the Related Art

For an animal litter box used by pets such as cats kept in rooms to evacuate urine or feces in a room, a product described in Japanese un-examined patent publication JP-10-229768-A is named, for example. The animal litter box described in JP-10-229768-A is that a plurality of water repellent granular materials is placed in a container having a bottom part with a bottom sheet which has a liquid passing structure. An absorbing sheet supported by a support body is disposed under the bottom sheet of the container in close contact with the bottom sheet.

In this animal litter box, urine passes through among the water repellent granular materials and through the bottom part of the container, and then is absorbed into the absorbing sheet. Therefore, urine does not remain in the container, and the litter box is cleaned only by changing the liquid-absorbing sheet once a day. In addition, it is fine that the granular materials soiled with urine or feces are changed once a month or two months.

However, since the animal litter box described in Patent Document mentioned above has a premise that the liquid-absorbing sheet is changed once a day, waste is generated everyday even though it occurs once a day, being troublesome. Furthermore, since the bottom part of the container on which the granular materials are placed is very close to the absorbing sheet, urine returns back when an absorbed amount is increased by long time use, which causes a problem that long time use is not allowed. Moreover, since the granular materials are water repellent with no liquid absorption, moisture of feces cannot be removed as well as urine remains around the granular materials and become rotten, which causes a problem that undesirable odors occur as well. Therefore, a problem for the time being is to provide an animal litter box system that can prevent the occurrence of undesirable odors from animal excrement of animals, especially pet animals, and can save the trouble of changing the liquid-absorbing sheet and the granular materials as much as possible for long time use.

SUMMARY OF THE INVENTION

The present invention has been made in view of the problems mentioned above. An object of the present invention is to provide an animal litter box system that can be used for a long time about 3 to 10 days and can prevent the occurrence of undesirable odors, particularly to provide a liquid-absorbing sheet used for the animal litter box system.

In order to achieve the object, the inventors diligently investigated and made the present invention. More specifically, the present invention is to provide the following.

(1) A liquid absorptive liquid-absorbing sheet for an animal litter box comprising an antimicrobial and bacteriostatic part having both an antimicrobial property and a bacteriostatic property; or both of an antimicrobial part having an antimicrobial property and a bacteriostatic part having a bacteriostatic property.

According to the invention described in (1), since the liquid-absorbing sheet has an antimicrobial property, it can inhibit the growth and proliferation of microbes such as bacterium and fungus. Therefore, it can prevent the occurrence of undesirable odors and can reduce a sickening sense in changing the liquid-absorbing sheet, and also can be used for a long time.

Moreover, since the liquid-absorbing sheet has also a bacteriostatic property, it can reduce the growth and proliferation of microbes and can neutralize ammonia generated from rotten urine. Therefore, the liquid-absorbing sheet can prevent the occurrence of undesirable odors and can reduce a sickening sense in changing the liquid-absorbing sheet, and also can be used for a long time.

Here, the 'antimicrobial property' means that the growth and proliferation of microbes is inhibited, and the 'bacteriostatic property' means that the growth or proliferation of microbes is subdued in this specification.

(2) The liquid-absorbing sheet for the animal litter box according to (1), wherein the antimicrobial property is imparted by a cationic surfactant being contained.

According to the invention described in (2), the cationic surfactant is used as an ingredient to impart the antimicrobial property, preferably didecyldimethylammonium adipate is used. Since didecyldimethylammonium adipate is safer than the other typical ingredients to impart the antimicrobial property in oral toxicity and skin irritation, it is preferably used.

(3) The liquid-absorbing sheet for the animal litter box according to (1) or (2), wherein the bacteriostatic property is imparted by an organic acid being contained.

According to the invention described in (3), undesirable odors can be lessened by using the organic acid as an ingredient to impart the bacteriostatic property, which can neutralize ammonia generated from rotten urine. Among the organic acids, citric acid is a crystal, and thus it is preferably used in view of the productivity of the liquid-absorbing sheet.

(4) The liquid-absorbing sheet for the animal litter box according to any one of (1) to (3), wherein the antimicrobial property is imparted by an ingredient to impart the antimicrobial property, and 0.1 g or more of the ingredient to impart the antimicrobial property is contained per liquid-absorbing sheet.

According to the invention described in (4), since 0.1 g or more of the ingredient to impart the antimicrobial property is contained per a liquid-absorbing sheet, the occurrence of undesirable odors can be prevented effectively even though the liquid-absorbing sheet is used for a long time. However, when the ingredient to impart the antimicrobial property is contained excessively, it is not preferable because a problem arises in safety in case where a pet eats it. Furthermore, there is not much difference in an advantage to be obtained even though the ingredient to impart the antimicrobial property is contained excessively.

(5) The liquid-absorbing sheet for the animal litter box according to any one of (1) to (4), wherein the bacteriostatic property is imparted by an ingredient to impart the bacteriostatic property, and 0.1 to 10.0 g of the ingredient to impart the bacteriostatic property is contained per liquid-absorbing sheet.

According to the invention described in (5), since 0.1 to 10.0 g of the ingredient to impart the bacteriostatic property is contained per liquid-absorbing sheet, the liquid-absorbing sheet can neutralize ammonia generated from rotten urine and can prevent the occurrence of undesirable odors. It is preferable that the ingredient to impart the bacteriostatic property is contained 0.25 to 1.0 g per liquid-absorbing sheet. It is not preferable that the content of the ingredient to impart the bacteriostatic property is too much, because pH is reduced excessively to cause the water absorptive property of the super absorbent polymer comprising the liquid-absorbing sheet to be lowered. The liquid absorbed into the liquid-absorbing sheet might return back to the front surface of the liquid-absorbing sheet depending on the circumstances.

(6) The liquid-absorbing sheet for the animal litter box according to any one of (1) to (5), wherein the liquid-absorbing sheet has an area of 2000 $cm^2$ or below, a thickness of 1.5 to 5.0 mm, and a water retention capacity of 400 g or greater.

According to the invention described in (6), since the liquid-absorbing sheet has an area of 2000 $cm^2$ or below, a thickness of 1.5 to 5.0 mm, and a water retention capacity of 400 g or greater, it has sufficient water absorptive capacity, and can be used for a long time. Here, the 'water retention capacity' means an amount of liquid held after the liquid-absorbing sheet having been immersed in physiological salt solution for 10 minutes is suspended for 10 minutes and is dehydrated by a dehydrater of 150 G for 90 seconds.

(7) The liquid-absorbing sheet for the animal litter box according to any one of (1) to (6), wherein the liquid-absorbing sheet has a liquid permeable front layer, a liquid impermeable back layer, and an absorption layer with liquid absorptive property sandwiched between the front layer and the back layer, and the antimicrobial and bacteriostatic part, or the antimicrobial part and/or the bacteriostatic part is disposed in the absorption layer.

According to the invention described in (7), the liquid-absorbing sheet can suppress the occurrence of undesirable odors more effectively than (1) and can be used for a long time. For example, when two or more of the absorption layers are disposed separately and the antimicrobial and bacteriostatic part, or the antimicrobial part and/or the bacteriostatic part is sandwiched between the absorption layers, liquid easily move downward to improve the water absorptive property as compared with the case where the absorption layer is a single layer. Furthermore, an antimicrobial agent irritant to skin can be prevented from exuding to the surface, and a powder bacteriostatic agent can be fixed in the liquid-absorbing sheet. Moreover, when the absorption layer is a single layer, the thickness of the layer is increased in order to secure the water retention capacity required for the present invention, and the water absorptive property is reduced by inhibiting a super absorbent polymer from meeting liquid. However, it can be avoided by disposing two or more of the absorption layers separately.

(8) The liquid-absorbing sheet for the animal litter box according to (7), wherein the liquid permeable front layer is white.

According to the invention described in (8), the liquid permeable front layer is white to allow the amount and color of pet's urine to be known and then the health condition of the pet to be known. At present, commercially available pet sheets have a colored absorbing surface for discriminating between the front side and the back side of the sheets. Therefore, the advantage to know the health condition of pets is an unprecedented new advantage created by the present invention.

(9) The liquid-absorbing sheet for the animal litter box according to (7) or (8), wherein the liquid impermeable back layer is colored.

According to (9), the liquid impermeable back layer is colored, which can discriminate between the front side and the back side of the liquid-absorbing sheet and prevent the occurrence of a mistake in use.

(10) The liquid-absorbing sheet for the animal litter box according to any one of (7) to (9), wherein the liquid permeable front layer and/or the liquid impermeable back layer has an indication to allow discrimination between a front side and a back side.

According to (10), the liquid permeable front layer and/or the liquid impermeable back layer has the indication to allow the discrimination between the front side and the back side, and an error to mistake the front side for the back side in use can be prevented effectively. For the indication, patterns, company names, and house marks can be provided in addition to letters like these, allowing the provision of advertising effects. For example, it is fine to print 'FRONT SIDE' on the liquid permeable front layer so as not to fade color.

(11) An animal litter box comprising a granular material container having an opening for an animal going in and out, a liquid passing bottom part on which granular materials are dispersed, and a liquid-absorbing sheet holder placed under the bottom part of the granular material container on which the liquid-absorbing sheet is placed, wherein the liquid-absorbing sheet is the liquid-absorbing sheet in any one of (1) to (10).

According to the invention described in (11), the liquid-absorbing sheet according to the present invention is used along with the granular materials having a high liquid passing property and a liquid absorptive property in the animal litter box comprising the opening for an animal going in and out, the granular material holder having the liquid passing bottom part on which the granular materials are dispersed, and the liquid-absorbing sheet holder placed under the bottom part of the granular material container on which the liquid-absorbing sheet is placed. When the liquid-absorbing sheet according to the present invention is used for the animal litter box system like this, an animal litter which can be used for a long time about 3 to 10 days is provided.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

Hereinafter, embodiments of the present invention will be described with reference to the drawings. Additionally, in the description of a second embodiment, the description of the same configuration and advantages as those of a first embodiment is omitted.

First Embodiment

Total Configuration of the Liquid-Absorbing Sheet

Figure 1:
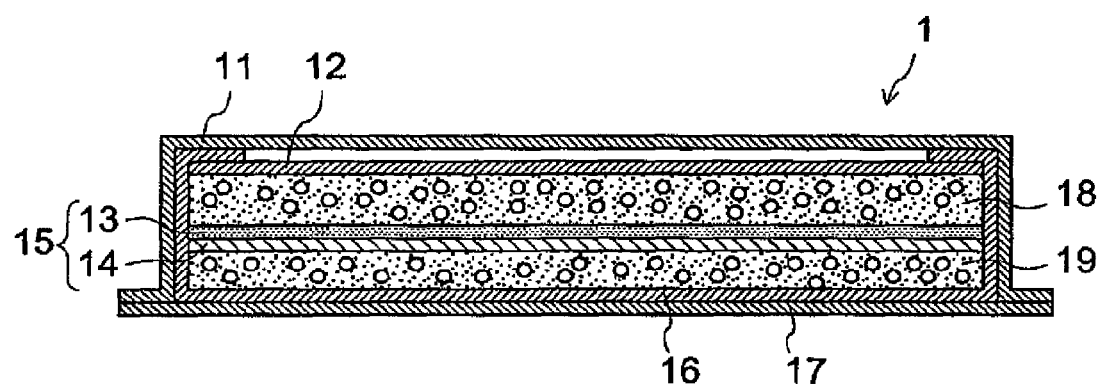
FIG. 1 is a cross-sectional view illustrating a first embodiment of the liquid-absorbing sheet according to the present invention.

FIG. 1 is a cross-sectional view illustrating a first embodiment of the liquid-absorbing sheet according to the present invention. A liquid-absorbing sheet 1 has an area of 2000 $cm^2$ or below and a thickness of 1.5 to 5.0 mm, and has water-absorptive property that a water retention capacity is 400 g or greater. The liquid-absorbing sheet 1 has a liquid permeable front layer 11, a liquid impermeable back layer 17, and an upper absorption layer 18 and a lower absorption layer 19 having liquid absorptive capacity. The upper absorption layer 18 and the lower absorption layer 19 are sandwiched between the liquid permeable front layer 11 and the liquid impermeable back layer 17. The liquid permeable front layer 11 is white, and the liquid impermeable back layer 17 is colored. An antimicrobial part 14 and a bacteriostatic part 13 contacting each other form an antimicrobial and bacteriostatic part 15 which is sandwiched between the upper absorption layer 18 and the lower absorption layer 19. Both of the upper absorption layer 18 and the lower absorption layer 19 contain pulp and a super absorbent polymer. An upper layer tissue 12 is sandwiched between the upper absorption layer 18 and the liquid permeable front layer 11, and an under layer tissue 16 is sandwiched between the lower absorption layer 19 and the liquid impermeable back layer 17. The upper layer tissue 12 and the under layer tissue 16 are white.

[Antimicrobial Part]

The antimicrobial part 14 contains an ingredient which imparts an antimicrobial property (hereinafter, it is called an ingredient imparting antimicrobial property). As the ingredient imparting antimicrobial property, didecyldimethylammonium adipate is used among cationic surfactants, but the other cationic surfactants are usable, not limited to this. Didecyldimethylammonium adipate is preferably used because it is highly safer than the other typical ingredients imparting antimicrobial property in oral toxicity and skin irritation.

A content of the ingredient imparting antimicrobial property is 0.1 g or more per liquid-absorbing sheet. This content is enough to impart the antimicrobial property to the liquid-absorbing sheet. As described above, when the ingredient imparting antimicrobial property is excessively contained, it is not preferable because a problem arises in safety in case where a pet eats it. Furthermore, there is not much difference in the advantage to be obtained even though the ingredient to impart the antimicrobial property is contained excessively. Additionally, the amount of the ingredient imparting antimicrobial property used per unit is 1 to 10 $g/m^2$.

[Bacteriostatic Part]

The bacteriostatic part 13 contains an ingredient which imparts a bacteriostatic property (hereinafter, it is called an ingredient imparting bacteriostatic property). For the ingredient imparting bacteriostatic property, citric acid is used among organic acids, but the other organic acids are usable, not limited to this. Since citric acid is a crystal, it is preferably used in view of productivity of the liquid-absorbing sheet.

Figure 4:
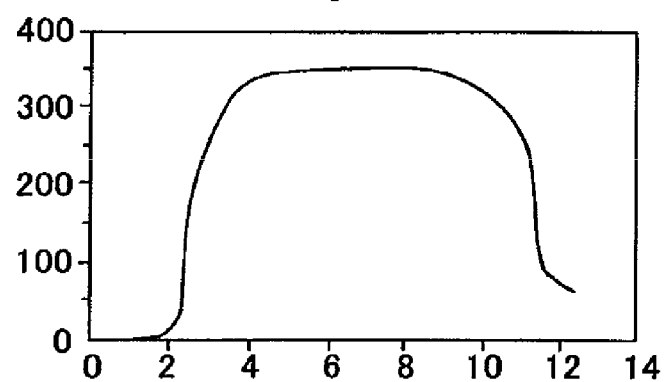
FIG. 4 is a diagram illustrating the relationship between the pH and the water absorption and retention of a super absorbent polymer used for the liquid-absorbing sheet according to the present invention.

A content of the ingredient imparting bacteriostatic property is 0.1 to 10.0 g per liquid-absorbing sheet, preferably 0.25 to 1.0 g. FIG. 4 is a diagram illustrating the relationship between the relationship between the pH and the water absorption ratio of a super absorbent polymer. The horizontal axis indicates the pH and the vertical axis indicates the water absorption ratio (times) of the super absorbent polymer. When the content of the ingredient imparting bacteriostatic property is too much, pH is lowered. As shown in FIG. 4, when pH is lowered, the water-absorption capacity of the super absorbent polymer is reduced. Additionally, the amount of the ingredient imparting bacteriostatic property used per unit is 5 to 50 $g/m^2$.

[Absorption Layer]

In this embodiment, there are two absorption layers; the upper absorption layer 18 and the lower absorption layer 19. Both of the absorption layers have pulp and a super absorbent polymer. As described above, two or more of absorption layers are separately disposed in this manner, which allows liquid to easily move downward to improve water-absorption capacity as compared with the case where the absorption layer is a single layer. Furthermore, when the absorption layer is a single layer, the thickness of the layer is increased in order to secure the water retention capacity required in the invention, and it becomes hard for the super absorbent to meet water. Consequently, the water absorption capacity is sometimes reduced. In this point, two or more of absorption layers is preferable to be disposed separately.

The super absorbent polymer exists among the crushed pulp inside the upper absorption layer 18 and the lower absorption layer 19. As the super absorbent polymer, polymers having high absorptive capacity such as starch-acrylic polymers are generally used other than polyacrylic polymers. These absorption layers are formed by layering crushed pulp and then applying a super absorbent polymer thereto.

In the upper absorption layer 18, the amount of pulp used per unit is 50 to 150 $g/m^2$, and the amount of super absorbent polymer used per unit is 30 to 100 $g/m^2$. Furthermore, in the lower absorption layer 19, the amount of pulp used per unit is 150 to 300 $g/m^2$ and the amount of a super absorbent polymer used per unit is 30 to 200 $g/m^2$. Moreover, the total content of pulp contained in the absorption layer (which is comprised of both the upper absorption layer 18 and the lower absorption layer 19) is 200 to 450 $g/m^2$, and the total content of a super absorbent polymer contained in the absorption layer is 60 to 600 $g/m^2$.

[Liquid Permeable Front Layer and Liquid Impermeable Back Layer]

For the liquid permeable front layer 11, nonwoven fabric such as through air, span lace, span bond, and polypropylene point bond nonwoven fabric are used. For the liquid impermeable back layer 17, polyethylene, polypropylene, and polyethylene terephthalate are used.

Since the liquid permeable front layer 11 is white, the amount and color of pet's urine can be known, and then the health condition of the pet can be known.

The liquid impermeable back layer 17 is colored. As described above, since the liquid permeable front layer 11 is white, the liquid impermeable back layer 17 is colored to discriminate between the front side and the back side.

Furthermore, the liquid permeable front layer 11 and/or the liquid impermeable back layer 17 can have an indication to discriminate between the front side and the back side as well. When the indication to discriminate between the front side and the back side is provided, an error to mistake the front side for the back side can be prevented in use.

[Mode of Usage]

Figure 3:
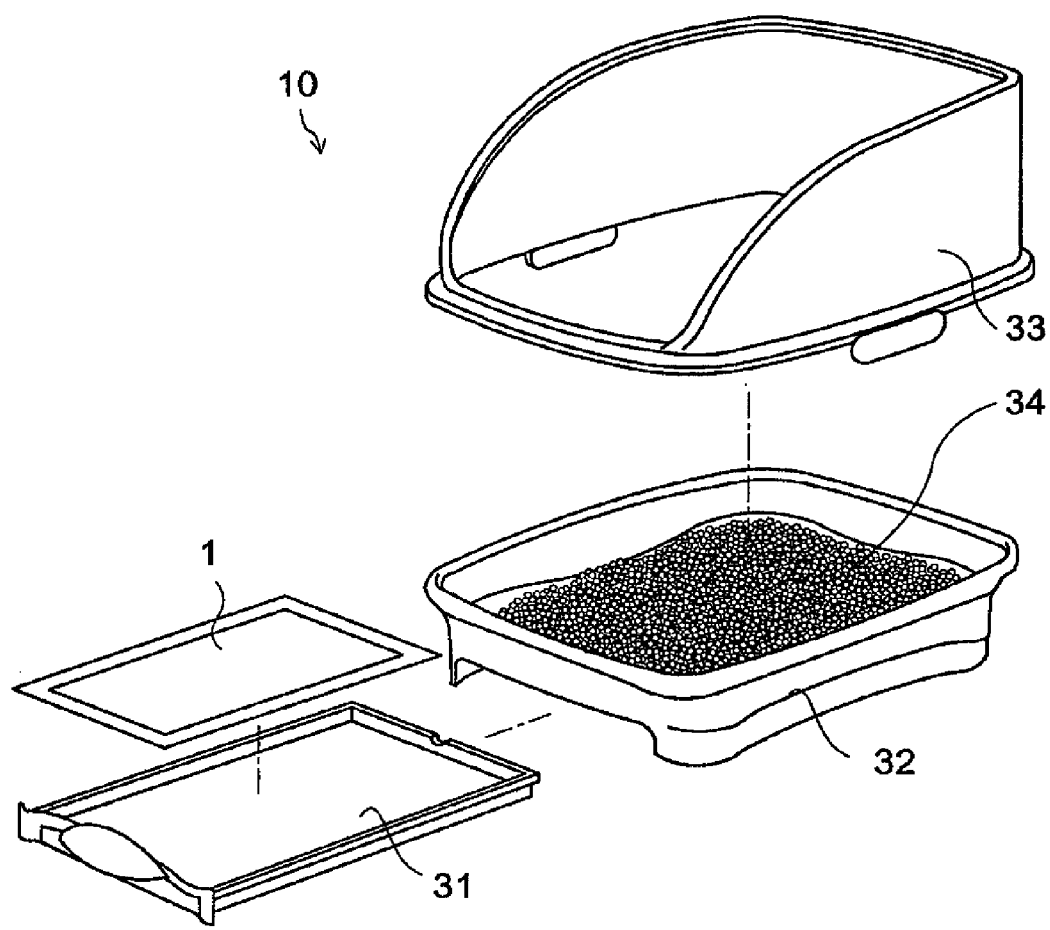
FIG. 3 is a diagram illustrating a mode to use the liquid-absorbing sheet according to the present invention.

FIG. 3 is a mode to use the liquid-absorbing sheet according to the present invention. The liquid-absorbing sheet 1 according to the present invention is used along with granular materials 34 for an animal litter box 10. The animal litter box 10 has a cover 33 for controlling (defining) the entrance for pets, a granular material container 32 having a liquid passing bottom part on which the granular materials are dispersed, and a liquid-absorbing sheet holder 31 placed under the bottom part of the granular material container 32. The liquid-absorbing sheet 1 is placed on the liquid-absorbing sheet holder 31.

The granular materials 34 are silica gel having a character of high liquid passing property and a liquid absorptive property. The animal litter box shown in FIG. 3 has a liquid leading part shaped by serial arch shapes in the bottom part on the side facing the liquid-absorbing sheet 1.

Advantage of the First Embodiment

In the liquid-absorbing sheet of the first embodiment, the absorption layer is separated to the upper absorption layer 18 and the lower absorption layer 19 and the upper and lower absorption layers are disposed separately on the front and back sides of the antimicrobial and bacteriostatic part 15 which is comprised of the antimicrobial part 14 and the bacteriostatic part 13 contacting each other. In this manner, two absorption layers are separately disposed to allow liquid to move downward to improve water-absorptive capacity as compared with the case where the absorption layer is a single layer.

Furthermore, the antimicrobial and bacteriostatic part 15 which is comprised of the antimicrobial part 14 and the bacteriostatic part 13 contacting each other is sandwiched between the upper absorption layer 18 and the lower absorption layer 19. Thus, it provides advantages that the liquid absorbing sheet 1 can prevent the ingredient imparting antimicrobial property irritant to human skin from exuding to the surface and fix a powder ingredient imparting bacteriostatic property in the liquid-absorbing sheet.

Since the ingredient imparting antimicrobial property is contained in the liquid-absorbing sheet, the occurrence of undesirable odors can be prevented effectively, and the liquid-absorbing sheet can be used for a long time.

Furthermore, since the citric acid is also contained in the liquid-absorbing sheet as the ingredient imparting bacteriostatic property, ammonia generated by rotten urine can be neutralized to prevent the occurrence of offensive odors. Moreover, the ingredient imparting bacteriostatic property has a function of a pH control agent to suppress a pH increase by neutralization reaction with ammonia. As apparent from the relationship between the pH and the water absorptive property of the super absorbent polymer shown in FIG. 4, the water absorptive property of the super absorbent polymer used for the absorption layer depends on pH, and a pH increase reduces the water absorptive property of the super absorbent polymer. Therefore, the ingredient imparting bacteriostatic property has an advantage to suppress a reduction in the water absorptive property of the super absorbent polymer as well.

The provision of the liquid-absorbing sheet according to the present invention in the mode shown in FIG. 3 allows pet's urine to smoothly move to the liquid-absorbing sheet for absorption. Therefore, an animal litter box system can be used for a long time and can prevent the occurrence of undesirable odors.

Second Embodiment

Total Configuration of the Liquid-absorbing Sheet

Figure 2:
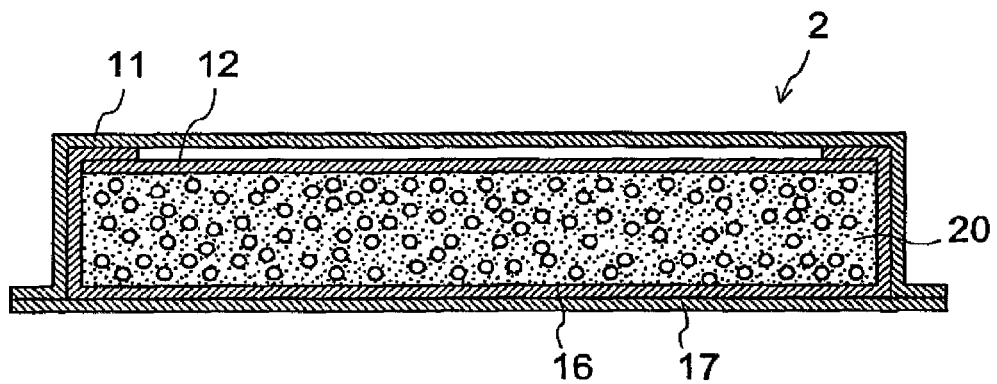
FIG. 2 is a cross-sectional view illustrating a second embodiment of the liquid-absorbing sheet according to the present invention.

FIG. 2 is a cross-sectional view illustrating a second embodiment of a liquid-absorbing sheet according to the present invention. A liquid permeable front layer 11, a liquid impermeable back layer 17, an upper layer tissue 12, and an under layer tissue 16 are the same as those in the first embodiment. The difference from the first embodiment is in that an absorption layer 20 in the second embodiment is a mixture of an antimicrobial part, a bacteriostatic part and the upper absorption layer or lower absorption layer of the first embodiment. More specifically, the absorption layer 20 of the second embodiment contains the antimicrobial part and the bacteriostatic part as well as pulp and a super absorbent polymer. Even though the absorption layer is formed as a single layer in the second embodiment, there is no problem as long as the water retention capacity required in the invention can be secured.

Advantage of the Second Embodiment

In addition to the same advantages as those in the first embodiment, there is an advantage that the liquid-absorbing sheet is fabricated easier than in the first embodiment.

Example

Hereinafter, an example of the first embodiment according to the present invention will be described, but the invention is not limited to the example.

The liquid-absorbing sheet of the first embodiment according to the invention was fabricated as below.

(A) First, crushed pulp was layered on an under layer tissue, and a polyacrylic super absorbent polymer was dispersed thereon to form a lower absorption layer. Furthermore, didecyldimethylammonium adipate as the ingredient imparting antimicrobial property and citric acid as the ingredient imparting bacteriostatic property were sequentially dispersed on the formed lower absorption layer to form an antimicrobial part and a bacteriostatic part.

(B) Subsequently, crushed pulp was layered on an upper layer tissue, and then a polyacrylic super absorbent polymer was dispersed thereon to form an upper absorption layer.

(C) Products obtained by (A) and (B) were joined so as to contact the bacteriostatic part with the upper absorption layer, polypropylene point bond nonwoven fabric was placed on the upper layer tissue as a liquid permeable front layer, and then polyethylene was placed under the under layer tissue as a liquid impermeable back layer to obtain a liquid-absorbing sheet.

The liquid-absorbing sheet obtained by the method mentioned above was used along with granular materials having a high liquid passing property and a liquid absorptive property in an animal litter box which has a granular material container having an opening for an animal going in and out and a liquid passing bottom part on which the granular materials are dispersed, a liquid-absorbing sheet holder placed under the bottom part of the granular material container on which the liquid-absorbing sheet was placed. Accordingly, an animal litter box system cloud be used for a long time and could prevent the occurrence of offensive odors.

As described above, the liquid-absorbing sheet according to the present invention has the antimicrobial and bacteriostatic part having both the antimicrobial property and the bacteriostatic property, or has both the antimicrobial part having the antimicrobial property and the bacteriostatic part having the bacteriostatic property. Therefore, it can prevent the occurrence of offensive odors even though it is used for a long time.

Furthermore, the liquid-absorbing sheet according to the invention has an area of 2000 $cm^2$ or below, a thickness of 1.5 to 5.0 mm, and a water retention capacity is 400 g or greater. Thus, it has sufficient water absorptive capacity, and can be used for a long time.

Moreover, the liquid-absorbing sheet according to the present invention is used along with the granular materials having a high liquid passing property and a liquid absorptive property in the animal litter box which has a granular material container having an opening for an animal going in and out and a liquid passing bottom part on which the granular materials are dispersed, the liquid-absorbing sheet holder placed under the bottom part of the granular material container on which the liquid-absorbing sheet is placed. Therefore, the animal litter box system can be used for a long time and can prevent the occurrence of offensive odors.

What is claimed is:

1. A liquid absorptive liquid-absorbing sheet for an animal litter box comprising:
   a liquid permeable front layer;
   a liquid impermeable back layer;
   an absorbent structure with a liquid absorptive property for absorbing liquids dispensed thereon sandwiched between the front layer and the back layer, and having an upper absorbent layer disposed at the front layer side and a lower absorbent layer disposed at the back layer side;
   a first tissue layer between the front layer and the absorbent structure;
   a second tissue layer extending from the back layer to the front layer and partially disposed between the first tissue layer and the absorbent structure to space the first tissue layer and the front layer; and
   an antimicrobial and bacteriostatic part including:
   an antimicrobial layer having antimicrobial property that is imparted by a cationic surfactant; and
   a bacteriostatic layer having bacteriostatic property that is imparted by an organic, wherein the antimicrobial layer and the bacteriostatic layer are directly in contact with one another and the bacteriostatic layer is layered directly on the antimicrobial layer;
   wherein the antimicrobial and bacteriostatic part is sandwiched between the upper absorbent layer and the lower absorbent layer,
   the absorbent structure includes an absorbent material dispersed with a superabsorbent polymer,
   wherein the antimicrobial layer includes didecyldimethylammonium adipate and the bacteriostatic layer includes citric acid.

2. The liquid-absorbing sheet for the animal litter box according to claim 1, wherein the antimicrobial property is imparted by an ingredient to impart the antimicrobial property, and
   0.1 g or more of the ingredient to impart the antimicrobial property is contained per liquid-absorbing sheet.

3. The liquid-absorbing sheet for the animal litter box according to claim 1, wherein the bacteriostatic property is imparted by an ingredient to impart the bacteriostatic property, and
   0.1 to 10.0 g of the ingredient to impart the bacteriostatic property is contained per liquid-absorbing sheet.

4. The liquid-absorbing sheet for the animal litter box according to claim 1, wherein the liquid-absorbing sheet has an area of 2000 cm$^2$ or below, a thickness of 1.5 to 5.0 mm, and a water capacity of 400 g or greater.

5. The liquid-absorbing sheet for the animal litter box according to claim 1, wherein the liquid permeable front layer is white.

6. The liquid-absorbing sheet for the animal litter box according to claim 1, wherein the liquid impermeable back layer is colored.

7. The liquid-absorbing sheet for the animal litter box according to claim 3, wherein the liquid impermeable back layer is colored.

8. The liquid-absorbing sheet for the animal litter box according to claim 1, wherein the liquid permeable front layer and/or the liquid impermeable back layer has an indication to allow discrimination between a front side and a back side.

9. The liquid-absorbing sheet for the animal litter box according to claim 3, wherein the liquid permeable front layer and/or the liquid impermeable back layer has an indication to allow discrimination between a front side and a back side.

10. The liquid-absorbing sheet for the animal litter box according to claim 4, wherein the liquid permeable front layer and/or the liquid impermeable back layer has an indication to allow discrimination between a front side and back side.

11. An animal litter box comprising:
    a granular material container having an opening for an animal going in and out, a liquid passing bottom part on which granular materials are dispersed; and a liquid-absorbing sheet holder placed under the bottom part of the granular material container on which the liquid-absorbing sheet is placed,
    wherein the liquid-absorbing sheet is the liquid-absorbing sheet according to claim 1.

12. A liquid absorptive liquid-absorbing sheet for an animal litter box which comprises:
    a liquid permeable front layer;
    a liquid impermeable back layer;
    an absorbent structure with a liquid absorptive property for absorbing liquids dispersed thereon, sandwiched between the front layer and the back layer, and having an upper absorbent layer disposed at the front layer side and a lower absorbent layer disposed at the back layer side;
    a first tissue layer between the front layer and the absorbent structure;
    a second tissue layer extending from the back layer to the front layer and partially disposed between the first tissue layer and the absorbent structure to space the first tissue layer and the front layer; and
    an antimicrobial and bacteriostatic part including:
    an antimicrobial laying having an antimicrobial property that is imparted by a cationic surfactant; and
    a bacteriostatic layer having a bacteriostatic property that is imparted by an organic, wherein the antimicrobial layer and the bacteriostatic layer are directly in contact with one another and the bacteriostatic layer is layered directly on the antimicrobial layer;
    wherein the antimicrobial and bacteriostatic part is sandwiched between the upper absorbent layer and the lower absorbent layer and contains an absorbent material which is a mixture of pulp and a superabsorbent polymer dispersed on the pulp, an amount of pulp in the upper absorbent layer is greater than an amount of pulp in the lower absorbent layer, and
    wherein the antimicrobial layer includes didecyldimethylammonium adipate and the bacteriostatic layer includes citric acid.

13. The liquid-absorbing sheet for the animal litter box according to claim 9, wherein the upper absorbent layer has 50 to 150 g/m$^3$ of pulp and 30 to 100 g/m$^3$ of superabsorbent polymer, and the lower absorbent layer has 150 to 300 g/m$^3$ of pulp and 30 to 200 g/m$^3$ of superabsorbent polymer.

14. The liquid-absorbing sheet for the animal litter box according to claim 1, wherein the upper absorbent layer, the lower absorbent layer, the antimicrobial layer and the bacteriostatic layer have substantially the same width and length dimensions.

* * * * *